(12) United States Patent
Khatri et al.

(10) Patent No.: US 8,811,619 B2
(45) Date of Patent: Aug. 19, 2014

(54) ENCRYPTION KEY MANAGEMENT SYSTEM AND METHODS THEREOF

(75) Inventors: Mukund P. Khatri, Austin, TX (US); Kevin T. Marks, Round Rock, TX (US); Don H. Walker, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 1221 days.

(21) Appl. No.: 12/262,962

(22) Filed: Oct. 31, 2008

(65) Prior Publication Data
US 2010/0111309 A1     May 6, 2010

(51) Int. Cl.
*G06F 21/00*     (2013.01)

(52) U.S. Cl.
USPC ................. 380/279; 713/2; 713/165

(58) Field of Classification Search
USPC ....................... 713/2, 165; 380/279
See application file for complete search history.

(56) References Cited

U.S. PATENT DOCUMENTS

| | | | | |
|---|---|---|---|---|
| 5,953,422 | A * | 9/1999 | Angelo et al. | 713/185 |
| 7,376,968 | B2 * | 5/2008 | Ritz et al. | 726/17 |
| 7,543,150 | B2 * | 6/2009 | Kudo et al. | 713/176 |
| 7,552,419 | B2 * | 6/2009 | Zimmer et al. | 717/121 |
| 7,751,584 | B2 * | 7/2010 | Zimmer et al. | 382/100 |
| 7,929,706 | B2 * | 4/2011 | Li | 380/286 |
| 7,949,874 | B2 * | 5/2011 | Lewis et al. | 713/170 |
| 8,127,127 | B2 * | 2/2012 | Liu | 713/2 |
| 2001/0007131 | A1 * | 7/2001 | Galasso et al. | 713/187 |
| 2007/0011491 | A1 * | 1/2007 | Govindarajan et al. | 714/27 |
| 2007/0208883 | A1 * | 9/2007 | Bircher et al. | 710/8 |
| 2007/0294520 | A1 * | 12/2007 | Leigh et al. | 713/1 |
| 2008/0016143 | A1 | 1/2008 | Bumpus et al. | |
| 2008/0022134 | A1 * | 1/2008 | Wang | 713/193 |
| 2008/0133905 | A1 * | 6/2008 | Challener et al. | 713/156 |
| 2009/0217374 | A1 * | 8/2009 | Liu et al. | 726/19 |
| 2009/0249053 | A1 * | 10/2009 | Zimmer et al. | 713/2 |

OTHER PUBLICATIONS

Server Management Command Line Protocol (SM CLP) Specification; DMTF; Document No. DSP0214; Mar. 7, 2007; version 1.0.2.*
Baseboard managment controller (BMC); May 10, 2007; accessed Mar. 13, 2012; searchnetworking.techtarget.com.*
A Secure and Reliable Bootstrap Architecture; William A. A.rbaugh, David J. Fubert, Jonathan M. Smith; 1997 IEEE.*
BIOS Boot Specification; Version 1.01; Jan. 11, 1996.*

* cited by examiner

*Primary Examiner* — Luu Pham
*Assistant Examiner* — James Turchen
(74) *Attorney, Agent, or Firm* — Larson Newman, LLP

(57) ABSTRACT

During execution of BIOS at an information handling system, a processor communicates with the storage controller via a command line protocol (CLP) communications channel. Via the channel, the processor obtains identification information for storage devices associated with the storage controller. The processor communicates the identification information to a key management client, which obtains encryption keys based on the identification information from a key management server. The processor receives the encryption keys, and communicates them to the storage controller via the CLP communications channel. The CLP communications channel thus provides a convenient and flexible interface for communication of security information prior to execution of an operating system.

18 Claims, 5 Drawing Sheets

ENCRYPTION KEY MANAGEMENT SYSTEM AND METHODS THEREOF

FIELD OF THE DISCLOSURE

This disclosure relates generally to information handling systems, and more particularly to transfer of security parameters for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Security measures for information handling systems have continued to increase in importance. One such security measure is data encryption. Typically, critical data is encrypted based on an encryption key and stored at a storage device, such as a hard disk or flash drive. The encrypted data can be decrypted using the same encryption key. Accordingly, it is typically desirable to protect the encryption key from unauthorized access in order to maintain the security of the encrypted data. In some information handling systems, encryption keys are stored locally in a protected manner. However, in such systems the key can be subject to unauthorized access (for example, the information handling system itself could be stolen or hacked).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
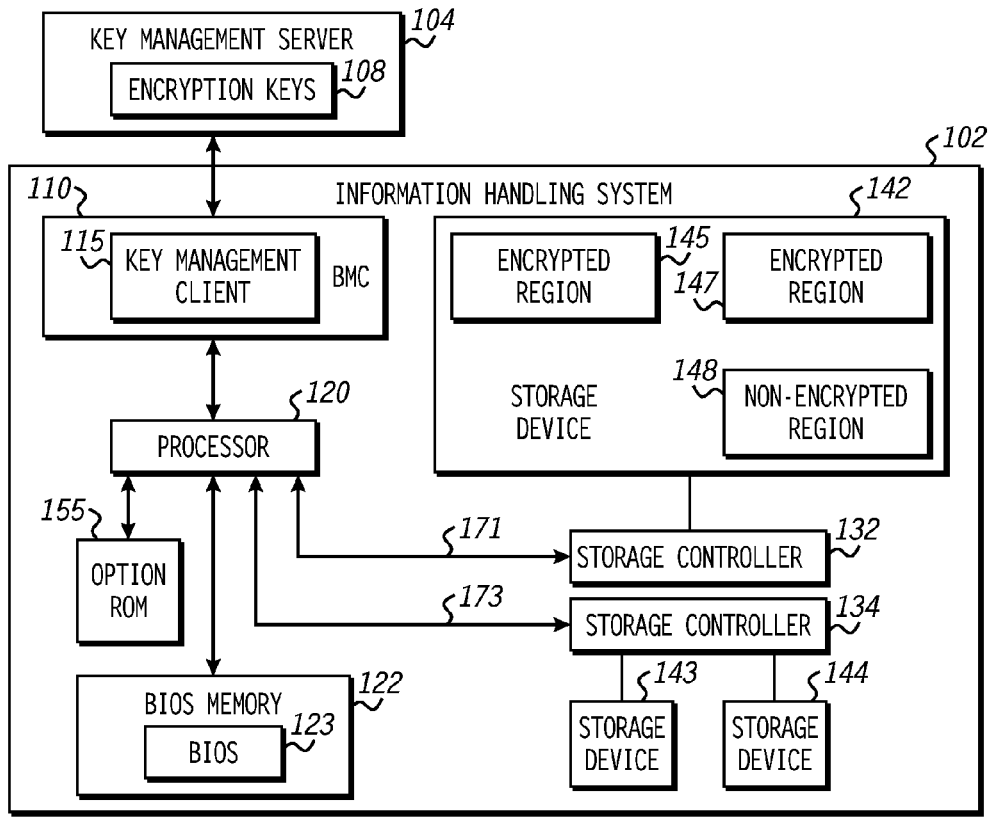
FIG. 1 illustrates a block diagram of an encryption key management system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

FIGS. 1-6 illustrate systems and methods for transferring security parameters, such as encryption keys, from a key management server to a storage controller of an information handling system. As described further herein, during execution of BIOS at the information handling system, a processor communicates with an option ROM associated with the storage controller via a command line protocol (CLP) channel. Using the CLP, the processor obtains identification information for storage devices associated with the storage controller. The processor communicates the identification information to a key management client, which obtains security information, such as encryption keys or authentication information based on the identification information from a key management server. The processor receives the encryption keys, and communicates them to the storage controller using the CLP channel. Use of the CLP channel to communicate information provides a convenient and flexible way to transfer security information prior to execution of an operating system.

The above-described method can be better understood with reference to FIG. 1, which illustrates an encryption key management system 100 according to one aspect of the present disclosure. The encryption key management system 100 includes an information handling system 102 connected to a key management server 104. It will be appreciated that the illustrated connection can be a direct connection, or a connection via a network, such as a local area network (LAN) or wide area network (e.g. the Internet).

Key management server 104 is configured to store a set of encryption keys 108. In response to a received encryption key request, the key management server provides one or more stored encryption keys. In an embodiment, the encryption key request includes identification information, indicating a storage device, a set of logical blocks of a storage device, or the like. Based on the identification information, the key management server selects one or more of the encryption keys 108 and communicates the selected keys.

The information handling system 100 includes a baseboard management controller (BMC) 110, a processor 120, a BIOS memory 122, storage controllers 132 and 134, storage devices 142, 143, and 144, and option ROM 155. The BMC 110 is connected to the key management server 104 and the processor 120. The processor 120 is further connected to the BIOS memory 122, the option ROM 155, and the storage controllers 132 and 134. The storage controller 132 is connected to the storage device 142, and the storage controller 134 is connected to the storage devices 143 and 144.

BMC 110 is configured to manage hardware components of the information handling system 102 based on information provided by system management software (not shown). For example, the BMC can be configured to monitor performance characteristics, environmental characteristics, or other characteristics of the information handling system 102 and manage hardware components based on the monitored characteristics. In the illustrated example of FIG. 1, BMC 110 is configured to execute a key management client 115. Key management client 115 is a computer program configured to receive a request for encryption keys and, in response to the request, communicate an encryption key request to the key management server 104. In response to the request, the BMC 110 receives one or more encryption keys, and communicates those keys to processor 120.

Processor 120 is a data processing device configured to execute sets of computer instructions to perform one or more specified tasks. For example, during a boot process, the processor 120 can access BIOS 123 stored at BIOS memory 122, and execute BIOS 123 to initialize the information handling system 102. After execution of the BIOS, the processor 120 can execute an operating system (not shown) in order to perform and manage specified tasks for the information handling system 102.

BIOS memory 122 is a memory configured to store initialization information, including BIOS 123, for information handling system 102. BIOS memory 122 can be volatile memory or non-volatile memory, such as flash memory or Read Only Memory (ROM).

Storage controllers 132 and 134 are configured to control storage devices 142, 143, and 144 respectively. In particular, after initialization of the information handling system, the operating system can provide storage requests, such as read and write requests, to storage controllers 132 and 134. In response to the requests, the storage controllers 132 and 134 can retrieve or store data at the storage device indicated by the request. As illustrated by storage device 142, a storage device can be assigned to store encrypted information. In an embodiment, configuration information (not shown) stored at the storage controller 132, the storage device 142, or another component of the information handling system 102, indicates whether a storage device is configured to store encrypted information.

In a particular embodiment, in response to determining a storage device is configured to store encrypted information, the associated storage controller performs encryption and decryption in response to read and write requests, respectively. For example, in response to a read request, the storage controller 132 can retrieve the requested information, decrypt the encrypted information based on an encryption key associated with the information, and provide the decrypted information to the operating system or requesting program. In response to a write request, the storage controller 132 can encrypt the information to be written based on the encryption key, and store the encrypted information at the storage device indicated by the request.

Storage devices can be configured so that only a portion of the device is configured for encryption. For example, storage device 142 includes encrypted regions 145 and 147, and non-encrypted region 148. Accordingly, storage controller 132 will perform encryption and decryption for storage requests associated with the encrypted regions 145 and 147, but typically will not perform encryption or decryption for storage requests associated with non-encrypted region 148. In an embodiment, a region is identified by the logical block addresses (LBAs) associated with the region. In addition, different encrypted regions can be associated with different encryption keys. Thus, for example, encrypted region 145 can store information encrypted according to a first encryption key, while encrypted region 147 stores information encrypted according to a different encryption key.

In another embodiment, the storage device 142 can perform encryption or decryption based on predefined encryption keys. In particular, in response to a read request associated with an encrypted region, the storage device 142 can decrypt the encrypted information and provide the decrypted information in response to the read request. Similarly, in response to a write request associated with an encrypted region, the storage device 142 can encrypt the data to be written prior to storing the data at the encrypted region. In this embodiment, the storage device 142 only performs encryption and decryption if the storage device 142 has satisfied an authentication procedure. Accordingly, the storage device 142 requests authentication information from the storage controller 132. In response to the request, the storage controller 132 can obtain authentication information as further described herein, and provide the information to the storage device 142. The storage device 142 authenticates the authentication information and, in response to determining the storage controller 132 is authorized to retrieve and store encrypted information, respond to read and write requests as described above.

In the illustrated embodiment of FIG. 1, processor 120 and storage controllers 132 and 134 are configured to communicate via busses 171 and 173, respectively. Further, processor 120 communicates information with each storage controller via a CLP communication channel. As used herein a CLP communication channel refers to a communication medium whereby information is transferred in accordance with a command line protocol (CLP). Examples of CLP include SMASH CLP and PCI Firmware 3.0 CLP.

In a typical CLP protocol, communications occur between the BIOS 123 and the option ROM 155. In particular, the processor 120 can execute code from the BIOS 123 and also execute code from the option ROM 155. For purposes of discussion, when the processor 120 is executing code from the BIOS 123 or the ROM 155, actions taken by the processor 120 will be referred to as being performed by the BIOS 123 or the ROM 155. Thus if, during execution of a portion of the BIOS 123, the processor 120 stores information, this action will be referred to as the BIOS 123 storing information.

The processor 120 alternates execution of code from the BIOS 123 and the option ROM 155 based on the CLP protocol. The BIOS 123 can transfer control of the processor 120 to the option ROM 155 by communicating an address, referred to as a CLP entry point, to the option ROM 155. The BIOS 123 can also communicate command parameters, metadata, or other information by storing the information in a buffer or other memory. Based on the stored information and the CLP entry point, the option ROM 155 performs one or more specified tasks. In addition, in the course of executing a task, the option ROM 155 can communicate commands and other information to the BIOS 123. In response, BIOS 123 can execute one or more specified tasks, including communicating with other portions of the information handling system 102 or external devices, such as the key management server 104. Accordingly, the BIOS 123 and option ROM 155 can exchange information via a CLP channel in order to perform specified tasks together.

In particular, during initialization of the information handling system 102, BIOS 123 can use the CLP channel to communicate encryption keys or authentication information to storage controllers 132 and 134, respectively. To illustrate, it is assumed for purposes of discussion that information handling system 102 has received an indication of an initialization event, such as a power-on or reset event. In response, processor 120 executes BIOS 123. BIOS 123 calls an entry point to option ROM 155. In response, option ROM 155 can initialize the controller, as well as storage device 142. For example, the option ROM 155 can request authentication information from storage controller 132 and receive the authentication information via the bus 171. The option ROM 155 can call an exit point to return control of the processor 120 to the BIOS 123. In response, BIOS 123 can authenticate the authentication information. In response to authenticating the authentication information, BIOS 123 can call a CLP entry point to transfer control of the initialization process to option ROM 155. In response to receiving control, option ROM 155 communicates a request for encryption keys for encrypted regions 145 and 147 to the BIOS 123 and calls a CLP exit point.

In response to the request, BIOS 123 sends a request for the encryption keys to the key management client 115. Based on the request, the key management client 115 requests the keys from key management server 104, which selects the specified encryption keys from encryption keys 108. The key management server 104 communicates the retrieved encryption keys to key management client 115, which in turn communicates the keys to BIOS 123 at processor 120. BIOS 123 communicates the retrieved keys to option ROM 155, which communicates the keys to storage controller 132. Thus, encryption keys are requested from the storage controller 132 and provided to the controller via a CLP channel. This provides a convenient and flexible way to communicate encryption keys during initialization of information handling system 102, prior to loading and execution of an operating system. Further, because the encryption keys are retrieved prior to the execution of an OS or other software, the likelihood of unauthorized access to the keys is reduced.

In another embodiment, where encryption and decryption is performed at the storage device 142, authentication information can be obtained from the key management server 104 in a similar manner as that described above with respect to the authentication keys 108, and transferred to the storage controller 132 via the CLP communication channel, as described above.

Figure 2:
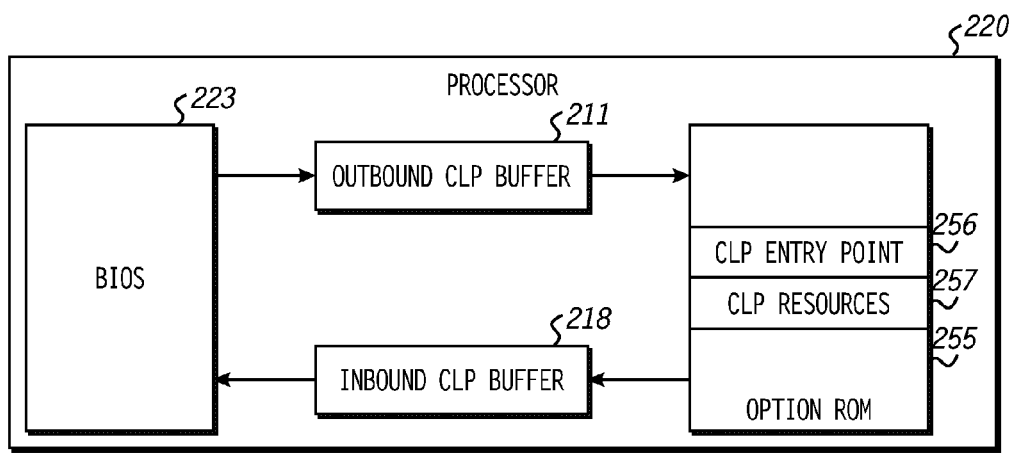
FIG. 2 illustrates a block diagram of portions of the information handling system of FIG. 1 according to one aspect of the present disclosure.

FIG. 2 illustrates a particular embodiment of portions of the information handling system 102. In particular, FIG. 2 illustrates details of a CLP channel at a processor 220, in accordance with one embodiment of the present disclosure. As illustrated, processor 220 can execute both BIOS code 223 and option ROM code 255. For purposes of discussion, when processor 220 is executing code associated with BIOS 223, BIOS 223 will be described as taking the action associated with the code. Similarly, when processor 220 is executing code associated with option ROM 255, option ROM 255 will be described as taking the action associated with the code. Thus, if BIOS 223 is referred to as communicating information to option ROM 255, this indicates that processor 220, in the course of executing BIOS code 223, stores information for subsequent use when executing code associated with option ROM 255. Accordingly, for purposes of discussion, BIOS 223 and option ROM 255 are referred to as independent modules, although each is executed at the processor 220.

Processor 220 also includes buffers 211 and 218 to facilitate communications between BIOS 223 and Option ROM 255. In particular, outbound CLP buffer 211 is configured to provide an interface for communication of information from the BIOS 223 to the option ROM 255 processor 120 to the processor 261 during initialization. Similarly, inbound CLP buffer 218 is configured provide an interface for communication of information from the processor 261 to BIOS 123.

To illustrate, BIOS 123 can request authentication information for a storage controller from option ROM 255 by storing information indicative of the request at outbound CLP buffer 211 and communicating the address associated with CLP entry point 256 via a communication bus (not shown). Communicating the address is referred to for purposes of discussion as "calling the CLP entry point." In response to the CLP entry point being called, control of processor 220 is transferred to the option ROM 255, which executes one or more of routines 257. In the course of executing the routines, processor 220 accesses the outbound CLP buffer 211 to retrieve the request for authentication information. In response to the request, option ROM 255 retrieves the authentication information from a storage controller, stores the retrieved authentication information at inbound CLP buffer 218 and communicates an indication of a CLP entry point exit via the communication bus (referred to for purposes of discussion as "calling a CLP exit"). In response to option ROM 255 calling the CLP exit, BIOS 123 accesses inbound CLP buffer 218 to retrieve the authentication information and authenticates it.

During initialization, encryption keys can also be communicated. For example, in response to authenticating the received authentication information, BIOS 123 can provide an indication via the communication bus that initialization control has been transferred to storage controller 132, and also call the CLP entry point 256 by communicating the associated address. In response, option ROM 255 can store information indicative of an encryption key request at inbound CLP buffer 218 and call a CLP exit. In response to the CLP exit, BIOS 123 retrieves the encryption key request from inbound CLP buffer 218 and, in response to the request, retrieves the requested keys from key management client 115, as described with respect to FIG. 1. BIOS 123 stores the requested keys at outbound CLP buffer 211, and calls CLP entry point 256. In response option ROM 255 retrieves the keys from outbound CLP buffer 211 and provides the retrieved keys to the associated storage controller.

Figure 3:
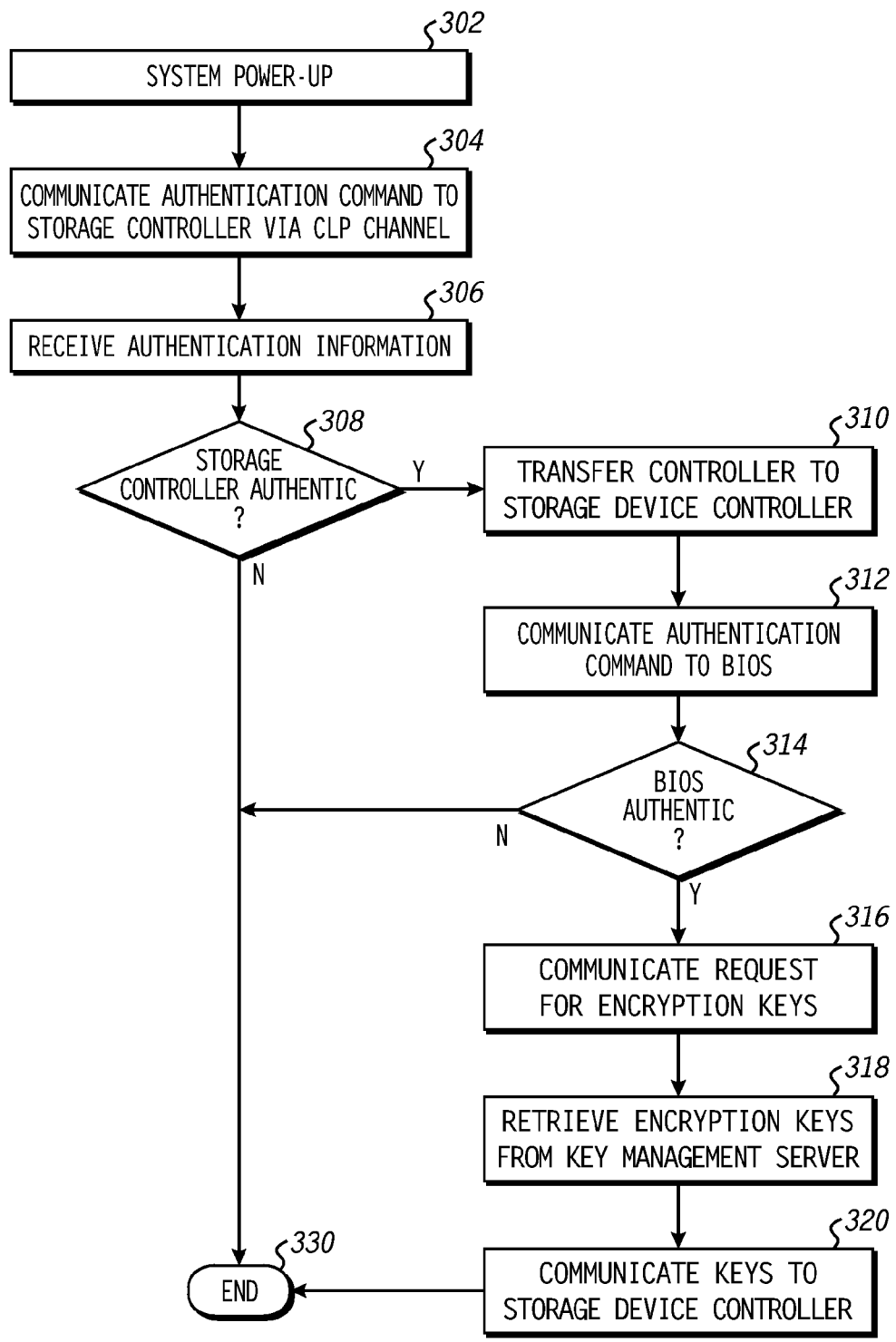
FIG. 3 illustrates a flow diagram of a method of obtaining an encryption key according to one aspect of the present disclosure.

FIG. 3 illustrates a flow diagram of a method of obtaining encryption information for a storage device in accordance with one embodiment of the present disclosure. At block 302, the information handling system 102 experiences a system power-up or other initialization event. In response, processor 120 executes BIOS 123. At block 304, BIOS 123 communicates an authentication command to option ROM 155 via a CLP channel as described above with respect to FIGS. 1 and 2. At block 306, BIOS 123 receives the authentication information via the CLP channel.

At block 308, BIOS 123 determines if the provided authentication information indicates that the storage controller 132 is an authorized component for information handling system 102. If not, the method flow moves to block 330, and the method ends without encryption keys being provided to the storage controller 132. Accordingly, if the storage controller 132 is not authentic, it will not receive encryption keys, thereby protecting encrypted or sensitive data from unauthorized access.

If, at block 308, it is determined that the authentication information indicates storage controller 132 is an authorized device, control of the initialization process is transferred to the storage controller 132 at block 310. At block 312, option ROM 155 communicates an authentication command to BIOS 123 via the CLP channel. In response, BIOS 123 communicates the requested information to the option ROM 155 via the same channel.

At block 314, option ROM 155 determines if the provided authentication information indicates that the BIOS is authorized BIOS for information handling system 102. If not, the method flow moves to block 330, and the method ends without encryption keys being provided to the storage controller 132. If, at block 314, it is determined that the authentication information indicates storage controller 132 is an authorized device, the option ROM 155 communicates a request for encryption keys via the CLP channel at block 316. At block 318, BIOS 123 retrieves the requested keys from the key management client 115. At block 320, BIOS 123 communicates the retrieved keys to storage controller 132 via CLP channel 171.

Figure 4:
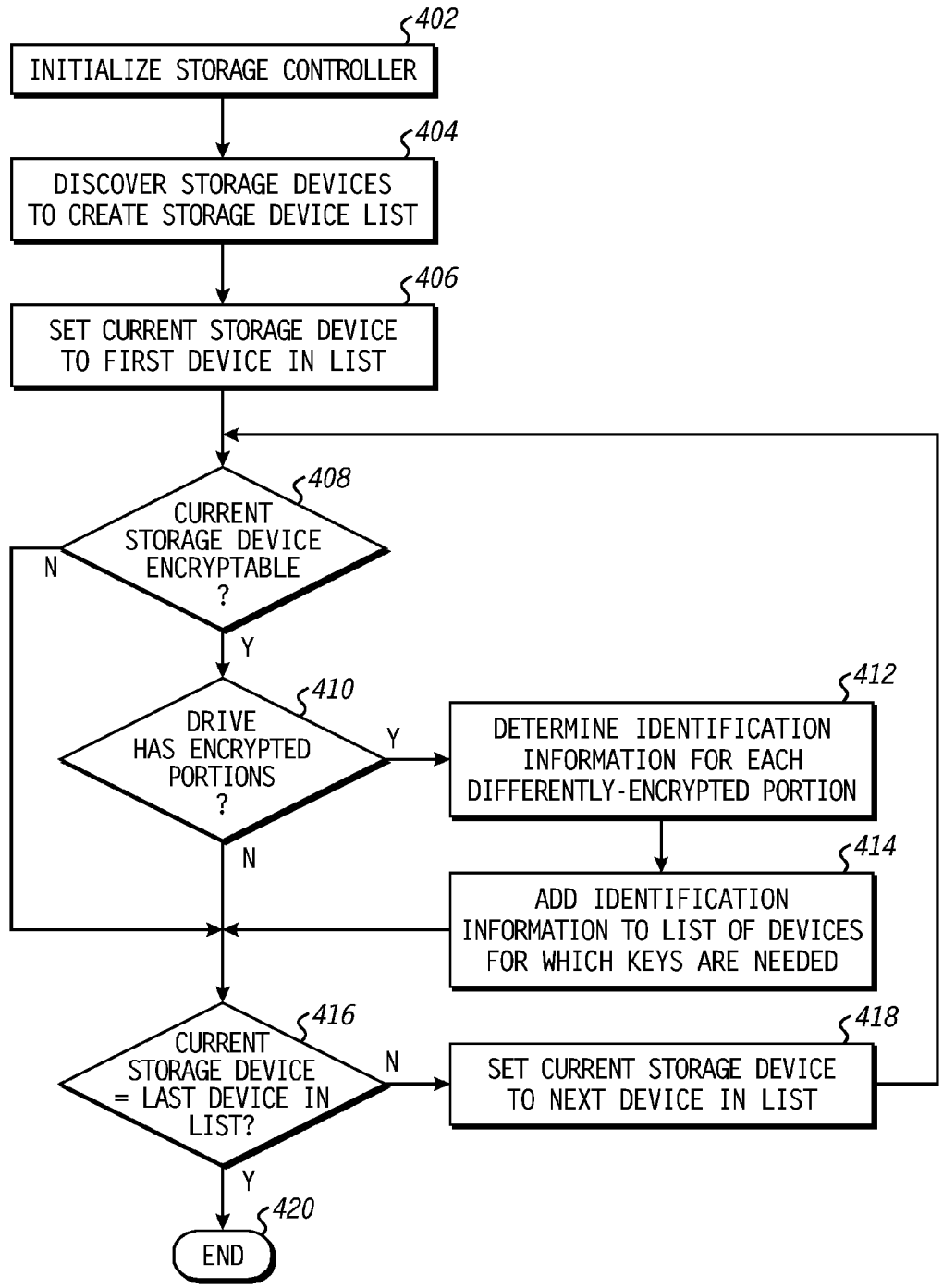
FIG. 4 illustrates a flow diagram of a method of obtaining a list of encryptable storage devices according to one aspect of the present disclosure.

FIG. 4 illustrates a method of determining storage device identification information in accordance with one embodiment of the present disclosure. At block 402, storage controller 132 is initialized so that it is able to communicate with storage device 142. At block 404, storage controller 132 discovers all storage devices, such as storage device 142 over which it will have control during operation of information handling system 102, and creates a storage device list based on the discovered devices. At block 406, storage controller 406 sets the current device for which identification information will be retrieved to the first device in the storage device list.

At block 408, storage controller 132 determines if the current storage device is encryptable. For purposes of discussion, a storage device is encryptable if it can include one or more storage regions that are configured to store encrypted information. If the current storage device is not encryptable, the method flow moves to block 416 and the storage controller determines if the current storage device is the last storage device in the storage device list. If so, the method flow moves to block 420 and the method ends. If not, the method flow moves to block 418 and the current storage device is set to the next storage device in the list. The method flow then returns to block 408.

If, at block 408, it is determined that the current storage device is encryptable, the method flow moves to block 410, and the storage controller 132 determines if the current storage device is configured to have one or more encrypted regions. If not, the method flow moves to block 416. If the storage device is configured to have one or more encrypted regions, the method flow proceeds to block 412 and the storage controller 132 determines identification information for each differently encrypted region (for example, each region associated with a different encryption key). Thus, for example, storage controller 132 can determine different identification information for each of encrypted regions 145 and 147. In an embodiment, the storage controller 132 determines the identification information by requesting the information from the current storage device. At block 414, the storage controller adds the determined identification information to a list of identification information associated with devices for which encryption keys are needed. During initialization, the list can be communicated to BIOS 123 as part of a request to retrieve encryption keys for the listed devices.

Figure 5:
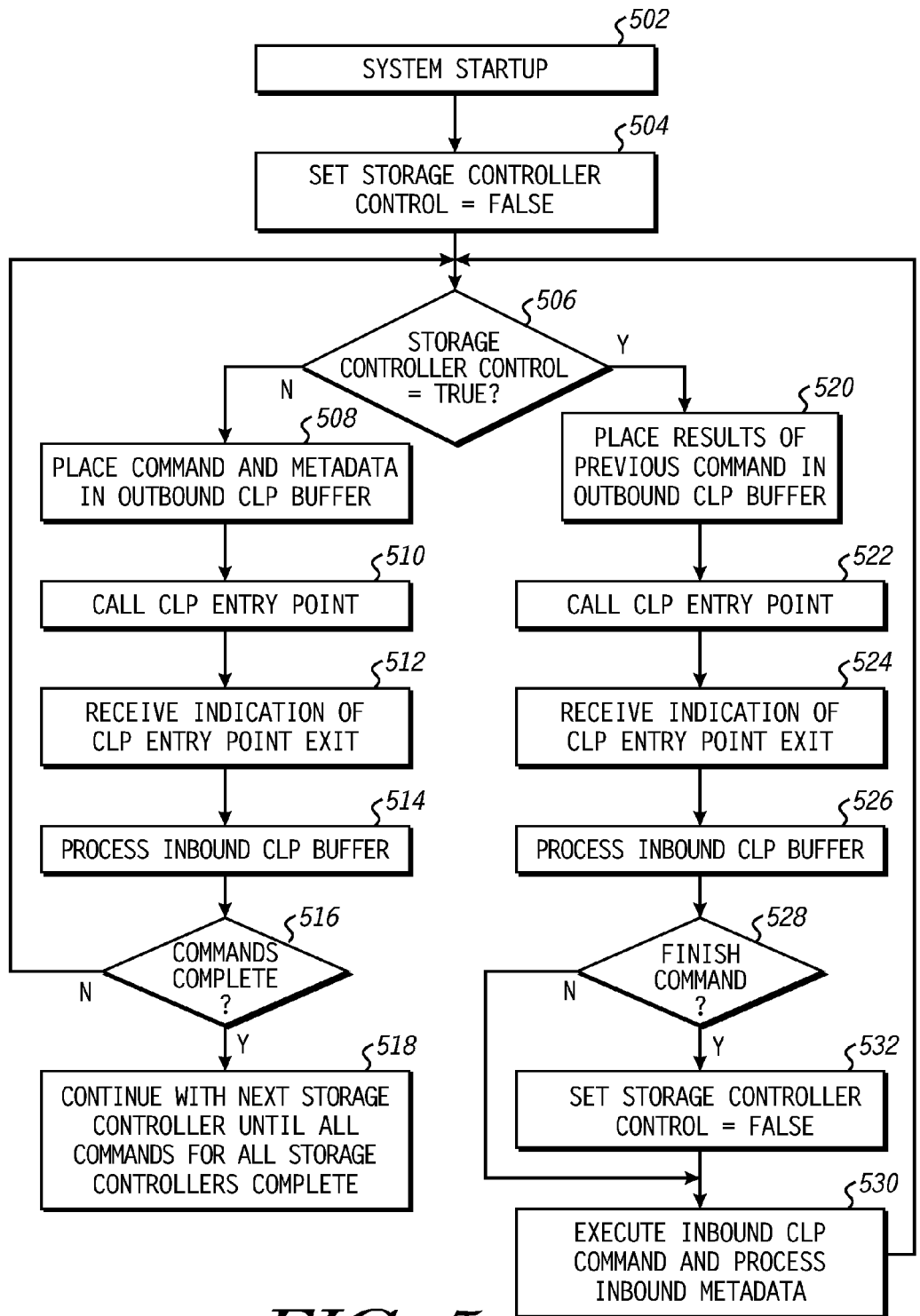
FIG. 5 illustrates a flow diagram of a method of employing a command line protocol (CLP) interface to transfer security information according to one aspect of the present disclosure.

FIG. 5 illustrates a flow diagram of a method of employing a command line protocol (CLP) channel to transfer security information according to one aspect of the present disclosure. At block 502, information handling system 102 receives an initialization indication, such as a power on or reset indication. In response, processor executes BIOS 123, which sets a storage controller control flag to a "false" state at block 504, indicating the storage controller 132 does not have control of the initialization process. It will be appreciated that, as commands are executed by the processor 120 by the BIOS 123 and the option ROM 155, the storage controller control flag can be set to a "true" state, thereby transferring control of the initialization process.

At block 506, the processor 120, in the course of executing the BIOS 123, determines if the storage controller flag is set to the true state, indicating the storage controller has control of the initialization process. If not, the method flow moves to block 508 and the BIOS 123 stores a command and metadata in the outbound CLP buffer 211. The metadata can include command parameters and other information to control the effects of command execution. At block 510, the BIOS 123 calls the CLP entry point 256 so that the previously stored command will be executed by the option ROM 155.

At block 512, the BIOS 123 receives an indication from the option ROM 155, indicating the previously stored command has been executed, and any results of the command have been stored at the inbound CLP buffer 218. For example, if the command was a request for authentication information, the requested information will be stored at CLP buffer 218 when the indication of the CLP entry point exit is received. At block 514, the BIOS 123 processes the inbound CLP buffer 218 to access any information stored as a result of command execution.

At block 516, the BIOS 123 determines if all commands to be communicated to the storage controller 132 have been executed. If not, the method flow returns to block 506 to continue providing commands. If all commands have been executed, the method flow proceeds to block 518, and the BIOS 123 provides commands to other storage controllers, in similar fashion to that described above, until all commands for all the storage controllers have been completed.

Returning to block 506, if the storage controller control flag is set to the true state, the method flow proceeds to block 520, and the BIOS 123 places the results of any previously executed command in the outbound CLP buffer 211. For example, if the storage controller previously communicated an authentication information request, the BIOS 123 will execute the request, and store the resulting authentication information in the outbound CLP buffer 520. At block 522, the BIOS 123 calls the CLP entry point 256 so that the option ROM 155 will process the information stored at the outbound CLP buffer 511.

At block 524, the BIOS 123 receives an indication of a CLP entry point exit from the option ROM 155, indicating a new command has been stored at the inbound CLP buffer 218. At block 526, the BIOS 123 processes the inbound CLP buffer 218 to retrieve the new command. At block 528, the BIOS 123 determines if the new command is a "finish" command, indicating that the option ROM 155 has completed communicating a set of commands, and wishes to return control of the initialization process to the BIOS 123. If the command is a finish command, the method flow moves to block 532 and the storage controller control flag is set to the false state. After setting the flag, or if at block 532 it is determined that the command is not a finish command, the method flow moves to block 530 and the BIOS 123 executes the new command retrieved from the inbound CLP buffer 218 at block 526. The BIOS 123, in the course of executing the command, also processes any metadata stored at the CLP buffer 218 that is associated with the command. The method flow returns to block 506 to continue processing of initialization commands.

The illustrated method of FIG. 5 can be employed to communicate commands associated with a security protocol for the storage controller. For example, the illustrated method can be used by the BIOS 123 to communicate authentication information requests to the option ROM 155, and to receive and process the information in order to authenticate the controller. Examples of other commands that can be communicated and processed include commands requesting device identification information, commands for the storage controller to change a set of stored encryption keys (e.g. a "rotate keys" command), a command to erase stored encrypted or non-encrypted data stored at the storage device 142 (e.g. a "force cryptographic erase" command so that data is erased via a cryptographic erase process), a command to setup a secure communication channel with the storage controller 132, or a command to transfer control of the initialization process to or from the storage controller 132. Thus, the illustrated method can be used to communicate security protocol commands, either during an initialization process, or during normal operation of the operating system 102. In one embodiment, use of the CLP channel to communicate these commands according to the illustrated method allows the commands to be communicated without direct interaction with the operating system, thereby providing for increased security.

Figure 6:
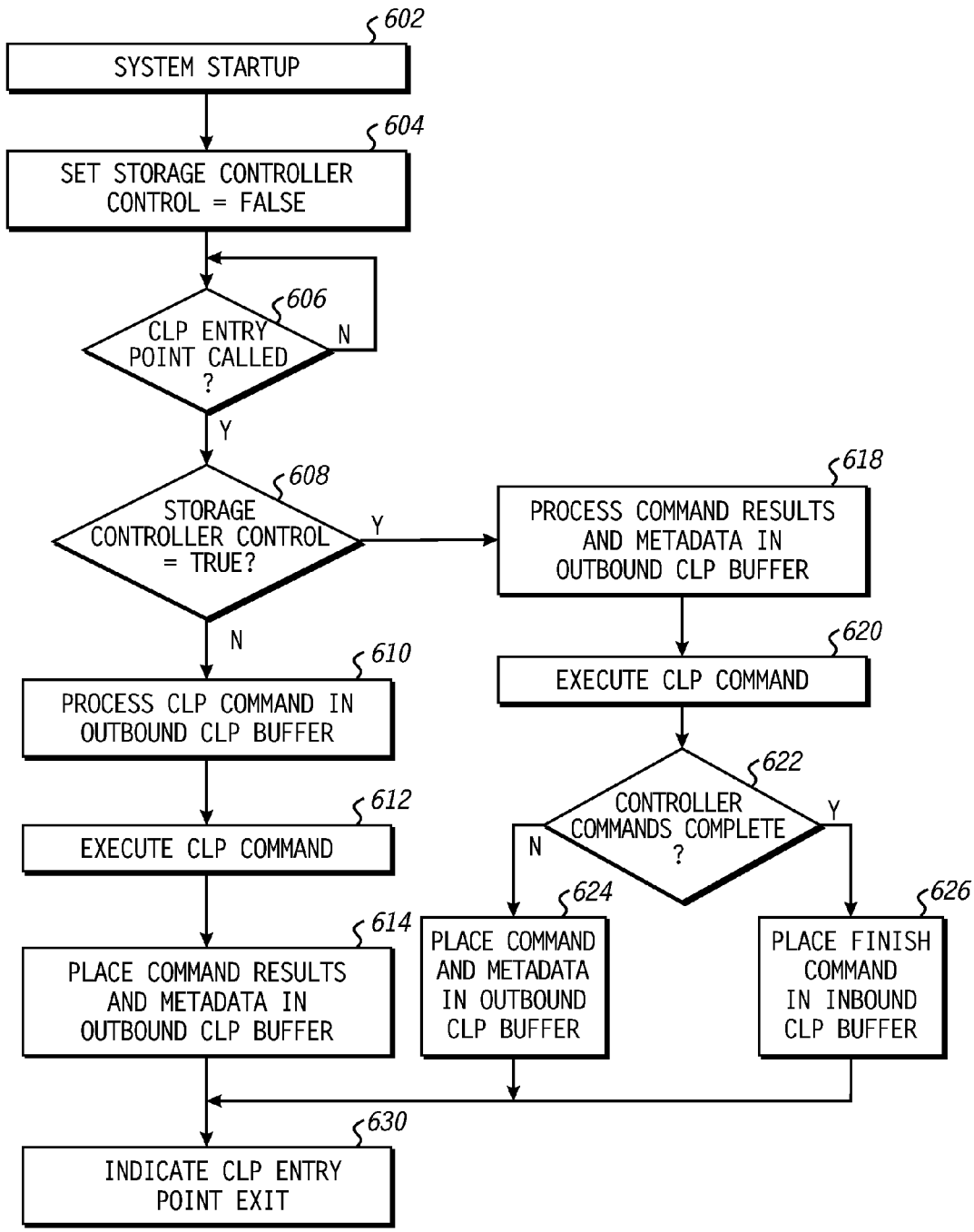
FIG. 6 illustrates a flow diagram of a method of employing a command line protocol (CLP) interface to transfer security information according to another aspect of the present disclosure.

FIG. 6 illustrates a flow diagram of a method of employing a command line protocol (CLP) channel to transfer security information according to another aspect of the present disclosure. At block 602, information handling system 102 receives an initialization indication, such as a power on or reset indication. In response, processor executes BIOS 123, which sets a storage controller control flag to a "false" state at block 604, indicating the option ROM 155 does not have control of the initialization process.

At block 606, the option ROM 155 determines if the CLP entry point 256 has been called by BIOS 123. If not, the method remains at lock 606 until the CLP entry point 256 is called. In response to the CLP entry point being called, the method flow proceeds to block 608, and the option ROM 155 determines if the storage controller control flag is set to the true state. If not (indicating the BIOS 123 has control and is therefore providing commands to the storage controller), the option ROM 155 retrieves the next command stored at the outbound CLP buffer 211 at block 610. At block 612, the storage controller 612 executes the retrieved command. At block 614, the option ROM 155 places any results of the command, including any resulting metadata, in the inbound CLP buffer 218. At block 630, the option ROM 155 indicates a CLP entry point exit to the BIOS 123, so that BIOS 123 can process the stored command results and metadata.

If, at block 608, option ROM 155 determines the storage controller control flag is in the true state (indicating the storage controller can communicate commands to the BIOS 123), the method flow moves to block 618 and the option ROM 155 retrieves any metadata or command result information (resulting from a previously executed command) is stored at the outbound CLP buffer 211. At block 620, the storage controller executes any CLP commands resulting from the information processed at block 618. For example, if the processed information includes authentication information provided by BIOS 123, at block 620 the option ROM 155 can execute a CLP command to compare the authentication information to expected information in order to determine whether the BIOS 123 is authentic.

At block 622, the storage controller 622 determines whether it has completed communicating initialization or other commands to the BIOS 123. If so, the method flow moves to block 626 and the option ROM 155 stores a finish command at the inbound CLP buffer 218. The method flow moves to block 630 and the option ROM 155 indicates a CLP entry point exit, so that BIOS 123 can process the finish command.

If, at block 622, the option ROM 155 determines that it has additional initialization or other commands to communicate, the method flow moves to block 624 and the storage controller stores the next command, together with any associated metadata, at the inbound CLP buffer 218. The method flow moves to block 630 and the option ROM 155 indicates a CLP entry point exit, so that BIOS 123 can process the stored command and metadata.

The illustrated method of FIG. 6 can be employed to communicate commands associated with a security protocol between the BIOS 123 and the option ROM 155. For example, the illustrated method can be used by the BIOS 132 to communicate authentication information requests to the BIOS 123, and to receive and process the information in order to authenticate the controller. Examples of other commands that can be communicated and processed include commands requesting encryption keys (e.g. a "get keys" command), commands for the processor 120 to store a set of keys (e.g. a "push keys" command), or a command to transfer control of the initialization process to or from the option ROM 155. Thus, the illustrated method can be used to communicate security protocol commands, either during an initialization process, or during normal operation of the operating system 102. In one embodiment, use of the CLP channel 171 to communicate these commands according to the illustrated method allows the commands to be communicated without direct interaction with the operating system, thereby providing for increased security.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
executing Basic Input Output System (BIOS) code by a processor during a boot process, thereby determining a first command line protocol (CLP) entry point of an option read-only memory (ROM) and thereby generating data;
storing the data in an outgoing CLP buffer;
executing by the processor code at the first CLP entry point of the option ROM, the executing including reading the data stored in the outgoing CLP buffer;
storing by the option ROM in an incoming CLP buffer a first request for a first security parameter, the first request generated as a result of executing the code at the first CLP entry point, wherein the incoming CLP buffer may be the same buffer as the outgoing CLP buffer and wherein the first security parameter comprises an encryption key associated with a storage device, the storage device associated with a storage controller;
returning control of the processor to BIOS;
receiving by BIOS the first request for the first security parameter via the incoming CLP buffer;
determining the first security parameter based on the first request, comprising:
communicating by BIOS a second request to a key management server, the second request based on the first request; and
receiving the encryption key in response to the second request; and
communicating the first security parameter to the option ROM during the boot process via placing the first security parameter in the outgoing CLP buffer.

2. The method of claim 1, wherein receiving the first request comprises receiving the first request in response to communicating a first memory address to a storage controller, the first memory address associated with the first CLP entry point of the option ROM.

3. The method of claim 1, wherein communicating the second request comprises communicating the second request to a baseboard management controller (BMC).

4. The method of claim 1, wherein the first security parameter comprises a plurality of encryption keys associated with a plurality of storage devices, each storage device associated with a storage controller.

5. The method of claim 1, wherein:
the option ROM is associated with a storage controller;
the first request for the first security parameter is a request by the storage controller; and
the method further comprises:
communicating a second request, the second request for authentication information, to the storage controller via the outgoing CLP buffer;
receiving the authentication information from the storage controller in response to the second request; and
communicating the first security parameter in response to authenticating the authentication information.

6. The method of claim 1, wherein:
the option ROM is associated with a storage controller;
the first request for the first security parameter is a request by the storage controller; and
the method further comprises:
receiving by BIOS from the storage controller a second request, the second request for authentication information via the incoming CLP buffer; and
communicating the authentication information in response to the second request.

7. The method of claim 1, further comprising:
communicating a security request to a storage controller via the incoming CLP buffer, the security request comprising a request to change an encryption key.

8. The method of claim 1, further comprising:
communicating a security request to a storage controller via the incoming CLP buffer, the security request comprising a request to erase a portion of encrypted information stored at a storage device associated with the storage controller.

9. The method of claim 1, wherein:
the option ROM is associated with a storage controller;
the first request for the first security parameter is a request by the storage controller; and
the method further comprises:
receiving a second request from a second storage controller for a second security parameter via the incoming CLP buffer;
determining the second security parameter based on the second request; and
communicating the second security parameter to the second storage controller via the outgoing CLP buffer.

10. An information handling system, comprising:
an option read-only memory (ROM) comprising a command line protocol (CLP) entry point;
an outgoing CLP buffer;
an incoming CLP buffer; and
a processor coupled to a CLP communications channel, the processor configured to:
store data in the outgoing CLP buffer during a boot process;
provide a first call to the CLP entry point in response to a boot request;
execute code at the CLP entry point, the execution to include reading the stored data;
receive in the incoming CLP buffer a first request for a first security parameter from the option ROM in response to providing the first call, wherein the first security parameter comprises an encryption key associated with a storage device, the storage device associated with a storage controller;
determine the first security parameter based on the first request;
provide a second call to another CLP entry point of the option ROM during the boot process in response to determining the first security parameter; and
communicate a second request to the storage controller via the incoming CLP buffer, the second request comprising a request to change the encryption key.

11. The information handling system of claim 10, wherein the first security parameter comprises an encryption key associated with a storage device, the storage device associated with a storage controller.

12. The method of claim 1, further comprising:
requesting authentication information from BIOS as the result of executing the code at the first CLP entry point; and
checking authentication information transmitted by BIOS in response to the requesting of authentication information.

13. The method of claim 3, further comprising:
receiving by BIOS from the BMC the encryption key; and
sending the key to the storage controller, wherein the storage controller is associated with the option ROM.

14. An information handling system, comprising:
an option read-only memory (ROM) comprising a command line protocol (CLP) entry point;

an outgoing CLP buffer;

an incoming CLP buffer; and a processor coupled to a CLP communications channel, the processor configured to:

store data in the outgoing CLP buffer during a boot process;

provide a first call to the CLP entry point in response to a boot request;

receive in the incoming CLP buffer a first request for a first security parameter from the option ROM in response to providing the first call, wherein the first security parameter comprises an encryption key associated with a storage device, the storage device associated with a storage controller;

determine the first security parameter based on the first request, comprising:

communicating a second request to a key management server, the second request based on the first request; and receiving the encryption key in response to the second request; and provide a second call to another CLP entry point of the option ROM during the boot process in response to determining the first security parameter.

15. The information handling system of claim 14 wherein communicating the second request comprises communicating the second request to a baseboard management controller (BMC).

16. The information handling system of claim 14 wherein the storage device is one of a plurality of storage devices each associated with a storage controller and the first security parameter comprises a plurality of encryption keys associated with the plurality of storage devices.

17. The information handling system of claim 14 wherein the processor is to communicate a second request to the storage controller via the incoming CLP buffer, the second request comprising a request to erase a portion of encrypted information stored at the storage device associated with the storage controller.

18. The information handling system of claim 15 wherein the processor is to receive the encryption key from the BMC and to send the key to the storage controller.

* * * * *